July 21, 1964 P. EISLER 3,141,795
STORAGE BATTERIES
Filed May 11, 1960 6 Sheets-Sheet 1

INVENTOR
Paul Eisler
By Watson, Cole, Grindle & Watson
ATTORNEYS

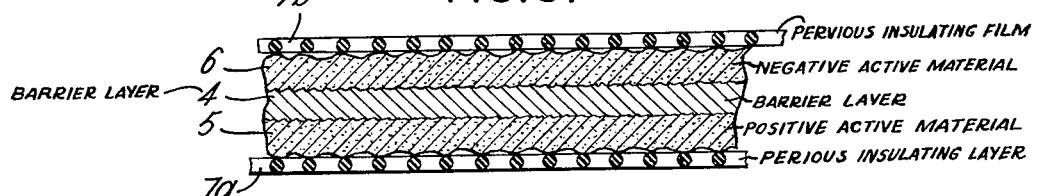
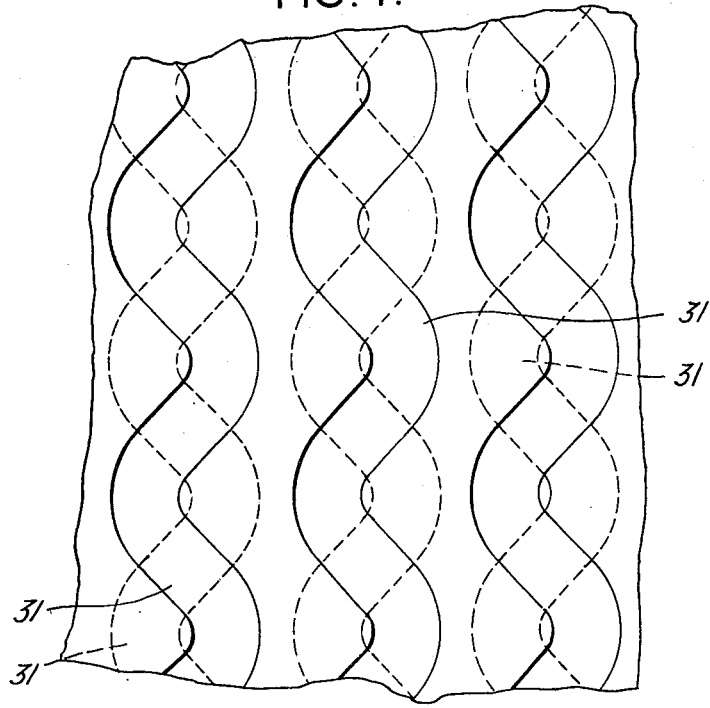
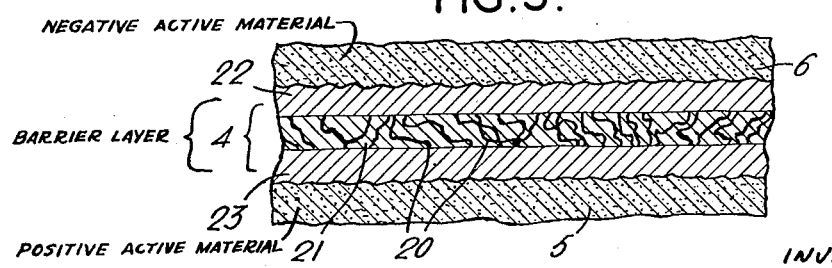

July 21, 1964 P. EISLER 3,141,795
STORAGE BATTERIES
Filed May 11, 1960 6 Sheets-Sheet 4

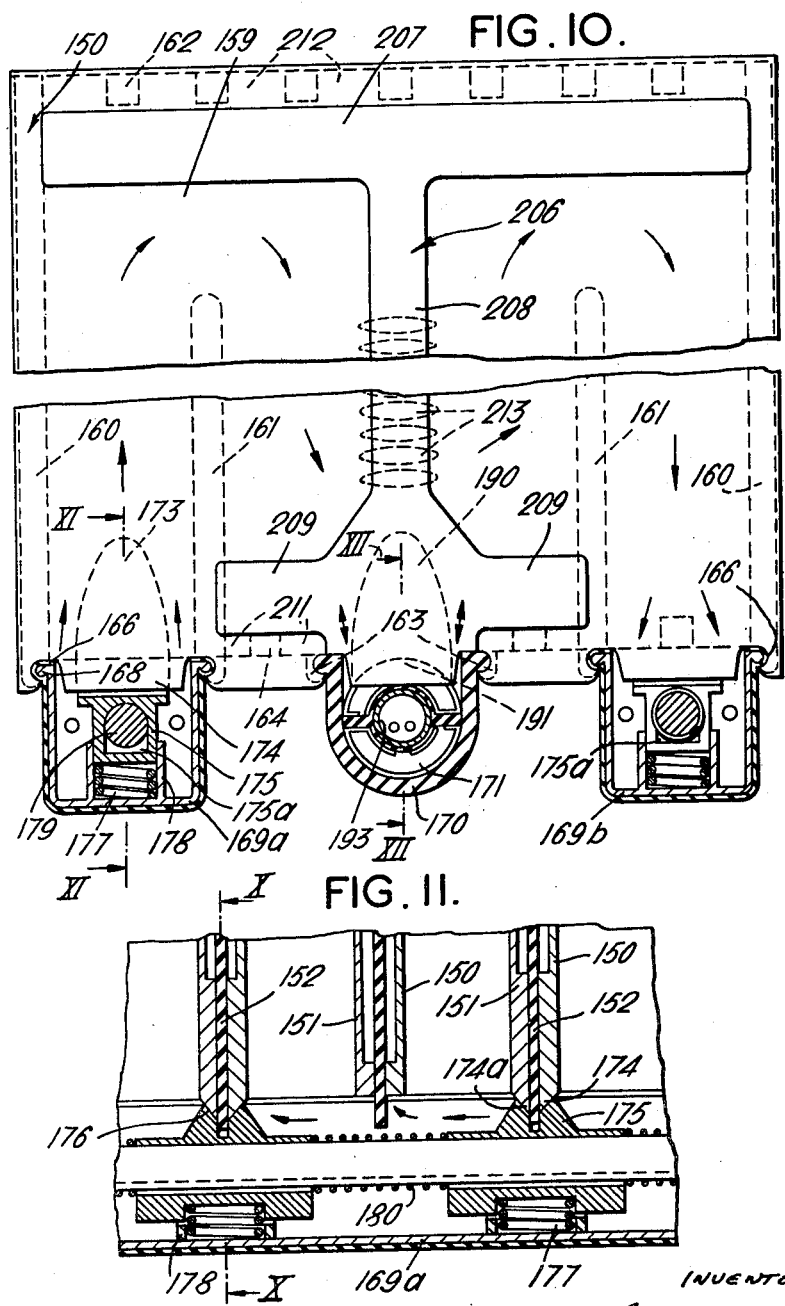

July 21, 1964   P. EISLER   3,141,795
STORAGE BATTERIES
Filed May 11, 1960   6 Sheets-Sheet 6

INVENTOR
Paul Eisler
By Watson, Cole, Grindle & Watson
ATTORNEYS

United States Patent Office 3,141,795
Patented July 21, 1964

3,141,795
STORAGE BATTERIES
Paul Eisler, 57 Exeter Road, London NW. 2, England
Filed May 11, 1960, Ser. No. 28,414
15 Claims. (Cl. 136—6)

This invention relates to secondary electric storage batteries. Although lead-acid batteries are specifically described hereinafter by way of example the invention is not limited to such batteries but comprehends all types of secondary batteries.

It is well known that the ability of storage batteries to supply peak loads is dependent on the active area of interface between the electrodes and the electrolyte, and for this reason plates for batteries which have to supply a heavy current for a short period expose a maximum amount of active material to the electrolyte. Sintered and porous materials, foil rosettes, etc. are fixed to grids which support these materials and conduct the electric current, these grids being mounted in an electrolyte chamber of inert material. However, the unevenness of the current distribution and the quick blocking of the minute channels within the plate thickness limits the duration of a heavy discharge and/or of the useful life of such batteries, and these limitations have led to efforts to make plates thinner.

These efforts have encountered not only the difficulty of fixing the thin active material to a grid and of ensuring the conduction of the electric current evenly over the whole plate surface, but also of preventing the early destruction of the plate by the chemical and mechanical forces acting on it during repeated charge and discharge cycles. Shocks and vibrations occurring in use of batteries e.g. as starter batteries in vehicles, also bear heavily on very thin plates: moreover it is difficult to handle and process flimsy plates by usual engineering methods; so far no technically practical and economically satisfactory solution has been found for these difficulties.

The general aim of the invention is to provide an improved battery capable of withstanding relatively heavy charge or discharge currents, and which is also robust and easy to manufacture. In contradistinction to earlier attempts to solve this problem which involved securing active material to grids mounted in an electrolyte chamber of inert material, the invention proposes the use of foil techniques where the foil is treated with and supports the active material, and the foil itself provides walls of the electrolyte chamber.

In its simplest form the invention provides a secondary battery cell comprising a pair of spaced oppositely disposed members secured together in insulating fashion over edge portions thereof to form a chamber adapted to contain electrolyte, each said member consisting of at least two layers the outer of which is an impervious conducting barrier layer of foil defining a wall of said chamber and the inner of which layers is composed of active material and supported on the barrier layer to provide an electrode of the cell, the barrier layer being such as to conduct current through its thickness from said inner layer to the exterior of the cell over substantially the whole area of the foil. The term "impervious" as applied to the barrier layer is to be understood herein to indicate that the corrosion rate of that layer is many times slower than the corrosion rate of the active layers, at the potential of the electrode in the given electrolyte at the concentrations existing.

In application to storage batteries comprising a plurality of individual cells connected electrically in series, the invention provides a battery comprising a series of generally parallel aligned spaced foils secured together in insulating fashion over edge portions thereof to define a plurality of chambers to contain electrolyte; each extreme foil of the series comprising an impervious conducting barrier layer defining an outer wall of one extreme electrolyte chamber, and a layer of active material supported on the inside of the barrier layer; each intermediate foil of the series comprising an impervious conducting barrier layer providing a dividing wall between two adjacent electrolyte chambers, and two layers of active material supported one on each side of said last mentioned barrier layer; the active layers being alternately of positive and negative nature and forming the electrodes of the cells; and the barrier layers being such as to conduct current through the thickness thereof over substantially the whole area of the foils thereby to transmit current between the active layers and to the exterior of the battery. This construction dispenses not only with the need to support thin active layers on grids, and to support the grids on cells, but also overcomes the problem of electrically connecting adjacent cells formerly solved by heavy cast connectors: in the multi-cell battery according to the invention the active layer is provided as a thin layer on the end walls of the cells themselves and these walls themselves conduct current between adjacent cells, or to the exterior of the battery.

It is a further important (but subsidiary) feature of the invention to construct a battery unit or block of fixed dimensions and a given number of cells (e.g. six 2-volt cells), called hereinafter a module, and to make up such batteries as may be required in commerce from different combinations of these modules: thus a 12-volt starter battery might consist of eight or more modules in parallel to give the necessary ampere-hours, and a 24-volt battery might consist of two pairs of four parallel-connected modules, and so forth. The construction of batteries in this way simplifies production, stock-keeping and the repair of damaged batteries.

The module principle leads to two further valuable features of the invention. Thus firstly with the appreciation that the modules can be made quite thin and without any heat-insulating barrier such as would be presented by a sheet of insulator the invention provides a multi-cell battery as defined in the penultimate paragraph and comprising a plurality of electrically interconnected modules retained in end to end relation under pressure, wherein means are provided between the modules which both electrically interconnect them in desired manner and form passages for cooling fluid (e.g. air or water) between the modules. Heat developed in each module is conveyed rapidly to the adjacent cooling means and is removed thence in the cooling medium. This enables rapid charge or discharge without damage to the individual cells by heating. The invention also provides a multi-cell battery as defined in the penultimate paragraph comprising a plurality of modules and means for interconnecting them electrically in at least two different ways to produce two or more output voltages which can be selected at will.

Further features of the invention, and objects and advantages thereof, will appear from the following description of various embodiments thereof given by way of example with reference to the accompanying more or less diagrammatic drawings, in which:

FIGURES 3 to 6 show various foil structures, FIGURES 3, 5 and 6 being partial sections of completed structures and FIGURE 4 a partial elevation of a foil in process of formation;

FIGURE 10 is a transverse vertical section taken on the line X—X shown in both FIGURES 11 and 12 of a further form of battery according to the invention;

FIGURES 11 and 12 are longitudinal sections—on the lines XI—XI, and XII—XII respectively shown in FIGURE 10—of the battery illustrated in that figure;

Figure 1:
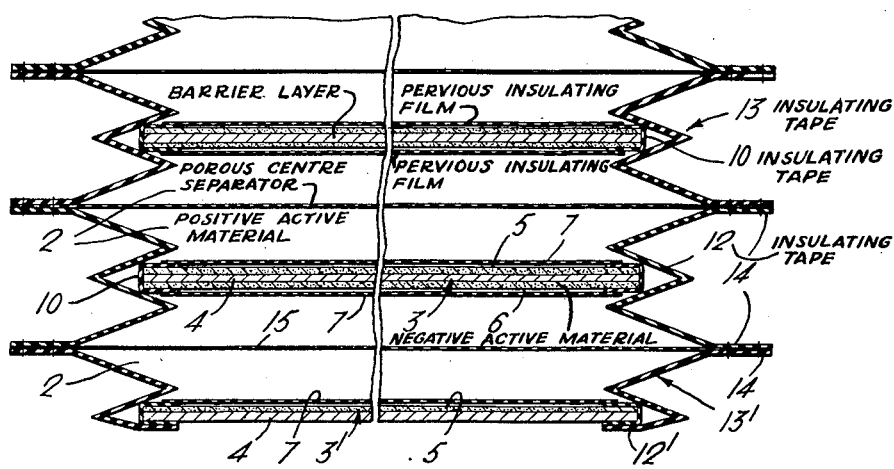
FIGURE 1 is a partial view in horizontal cross-section of a module according to the invention, the section being taken as shown by the line I—I on FIGURE 2.
Figure 2:
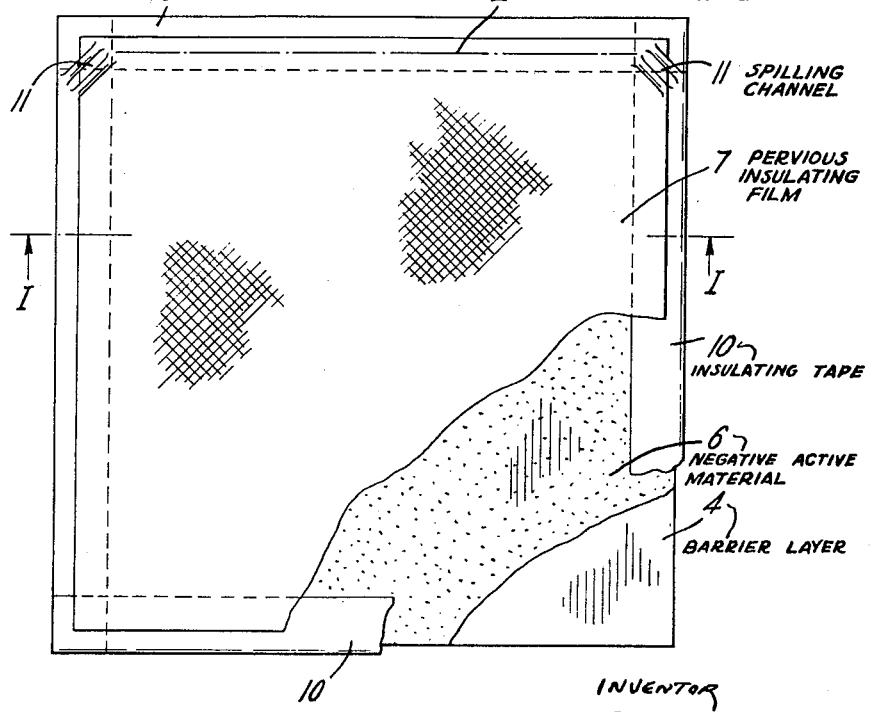
FIGURE 2 is an elevation of a taped foil forming part of the FIGURE 1 module before final assembly thereof.

Referring to FIGURES 1 and 2 of the drawings, the module of FIGURE 1, designated generally 1, comprises six series-connected similar cells 2; only a few cells are illustrated and these are shown somewhat expanded for the sake of clarity.

The module 1 comprises five intermediate foils 3 and foils 3' of similar dimensions which are spaced apart and disposed parallel and in alignment with one another, each foil comprising an impervious conducting barrier layer 4. One extreme foil 3' comprises a positive and the other a negative layer of active material, which layers are supported on the inside faces of the corresponding barrier layers 4. Intermediate foils 3 each comprise a layer of positive active material supported on one face of their barrier layer 4 and a layer of negative active material supported on the other face. The layers of positive and negative active material are, respectively, all similar and designated, respectively, 5 and 6: each active layer is supported over its entire area. Each active layer 5, 6 is covered with a pervious insulating separator film 7 e.g. nylon or P.V.C. gauze. Thus each cell 2 has electrodes consisting of a positive active layer 5 and a negative active layer 6, each covered by a porous separator film 7, each active layer being supported on a barrier layer 4 providing an end wall of the cell, adjacent cells being separated by a single common barrier layer and having their electrodes electrically connected by said barrier layer through its thickness and over its whole area. The terminals of the module are provided by the outer faces of the barrier layers 4 of the extreme foils 3' which are capable of conducting the battery current from extreme electrodes to the exterior of the battery through the thickness of said extreme barrier layers and over the whole area thereof.

All the edges of the foils 3, 3' are bound with impervious insulating tape 10 e.g. of thermoplastic plastics material, the foils and separator films 7 being adhesively- or heat-sealed to the tape at their edges; the foils may be sealed either to the outside, as shown, or to the inside of the tapes 10. The top corners of each foil 3, 3' together with its tapes 10 are embossed with a spilling channel 11 sloping downwardly to the side edges of the foil and tape. The side edges of the foils 3 together with the tapes 10 thereon are then introduced into the centre fold 12 of a concertina-folded tape 13 (e.g. also of a thermoplastic plastics material) presenting a pair of free edge portions 14: the side edges of the foils 3' are introduced into folds 12' of folded tapes 13' similar to the tapes 13 except that they have only one free edge portion 14. The tapes 13, 13' extend along the side edges only up to the bottom of the spilling channels 11: alternatively they could extend to the top of the foils and be perforated in the region of the outlet ends of the channels 11. The adjacent edge portions 14 of the various tapes 13, 13' are then sealed together as shown in FIGURE 1, preferably over two parallel lines, to sandwich pervious and preferably elastically compressible centre separators 15 for the cells, and the tapes 10 and sealed in the folds 12, 12'; as before, the sealing may be by adhesive or by application of heat. Finally the bottom of the module is sealed by "potting" the so-far assembled module in an elastomeric sealing compound that sets to an impervious yet elastic mass (not shown) between the bottom edges of the foils. This mass extends up to the bottom edges of the separator films 7 and downwards slightly below the module to form a shock-absorbing cushion on which the module can rest. The completed module will in use require to be kept under some degree of endwise pressure: various means to this end are described later. When under pressure the thickness of the module, which for illustrative purposes is shown much exaggerated in FIGURE 1, will be quite small.

The top edge of each cell 2 presents a narrow barely open slit between adjacent surfaces of the binding tapes 10, which suitably stiffen the top edges of the foils. The slit provides an escape for gas and enables the filling of the cell, which is effected by running a suitable liquid (distilled water in the case of a lead-acid battery) over the top of the module until it runs out of the spilling channels 11. These spilling channels determine the electrolyte level, which should lie within the depth of the top edge binding tapes 10; in FIGURE 2 the electrolyte level is shown at L (an alternative—or possibly additional—way of obtaining the same effects as results from the channels 11 would be to chamfer the corners of the cells, again providing for liquid discharge over or through the concertina tapes 13, 13'). It should be noted that without providing for adequate overflow through the spilling channels or equivalent the centre separators 15 would have to be dimensioned thicker or there would be a danger of a temporary rise of the liquid level above the top edge tapes 10. This liquid would form a leakage path or shunt between the cells 2. With a given endwise pressure on the module the volume of electrolyte in each cell, which is small, is determined by the nature and thickness of the centre separator 15.

The production of the modules can be completely automatised; the foil construction and at least the main part of its treatment is done on the foil strip in bulk in a continuous process and the separator films 7 are also laminated to the foil while it is a long strip off a coil. The same applies to the sealing of the edges of these films. The cutting of the foil into the size used in the module, the various tape applications and other cell assembly procedures can be carried out on an automatic flow line with no or only a minimum of human labour.

The porous separator films can be very thin porous plastic or microporous rubber films. Other alternatives are treated veneer films of beech, mango or Port Orford white cedar, treated filter paper or other compressed fibre material, such as glass mats, etc. Any of the known separator materials can be used if it is available as a very thin layer. The porosity or structure of the separator film 7 covering the positive foil surface must, per unit of time, and at least in conjunction with the nature of the active layers as described later, admit a larger volume of electrolyte to the positive foil surface than the volume admitted to the negative surface. The film 7 covering the positive active layers is therefore preferably of greater porosity than that covering active layers and/or crimped with the crimps running vertical, while the separator film covering the negative active layers can be smooth.

The centre separators 15 may be of fabric, crimped filter paper, mat, or any suitable thin porous material, which nevertheless has sufficient thickness and a structure which permits a ready flow of electrolyte, particularly in vertical direction: a preferred material is Porvic.

Each separator is of the same area as the separator films 7: instead of being secured at its edges to the tapes 13, 13' it may be left loose and kept in place only by endwise pressure on the module.

Other modifications in the module of FIGURES 1 and 2 can be made beyond those already indicated. Thus by way of example instead of "potting" the module to seal the bottom edges, such edges can be sealed by further lengths of concertina tape such as the tape 13', 13; the various lengths of tape would preferably be pre-cut to give the mitering lines.

Various foil structures suitable for use in a module such as just mentioned, and of the lead-acid type, will now be described with reference to FIGURES 3, 4, 5 and 6. It should be appreciated that each foil consists essentially of an impervious conducting barrier layer 4, a layer of positive active material 5 on one side thereof, and a layer of negative active material 6 on the other. As shown in FIGURE 3 the layers 5, 6 are covered by separator films 7a, 7b in the form of plastic gauzes, the mesh of the gauze 7a being coarser than that of the gauze 7b to admit more electrolyte to the positive active layer 5.

If (referring to FIGURE 3) both sides of the barrier layer 4 (here shown as a metal foil) are covered with lead by electro-deposition, laminating or otherwise, the active layers 5, 6 can be formed like a modern Planté plate. Forming in an electrolyte containing 14% sulphuric acid and 5% ammonium acetate while the foil is in continuous form has proved to be very speedy, but a "one-shot" formation when the foils are already assembled in the module is preferable as it obviates double handling. The forming process is less critical for the negative layer 6 of the foil structure, particularly if it is an electro-deposited lead surface already porous on its outside, than for the positive surface where the lead has to be oxidized into lead dioxide. As the full thickness of the lead on both sides of the barrier layer is not formed into this active material, the strata next to the barrier layer remains just lead and the foil structure which theoretically needs only to contain the three layers 4, 5, 6 specified above usually contains at least five, namely the two active layers 5, 6, two lead layers and the barrier layer 4 in the centre. This is indicated in both FIGURES 5 and 6 where however another barrier layer than the metal foil of the present example is used which entails some variations of procedure. Questions affecting the barrier layer itself will be discussed later.

A foil of good strength can be formed by a Planté process from a three-ply lead foil, the two outer layers consisting of compressed lead powder and the centre layer of a corrosion resistant but stronger lead alloy, such as for example lead calcium (with slightly less than .1% of Ca) or lead-tin-barium (3 to 3½% Sn-.1% Ba).

Instead of producing one or both active layers by fully forming them out of lead layers, they can be applied to the barrier layer 4 by covering one or both surfaces thereof with the pastes used in present-day accumulator plate manufacture, or preferably by electro-deposition of lead, for instance from a lead perchlorate solution including protein additions, on to the negative side of the barrier layer and of lead dioxide by anodic polarisation on to the positive side of the barrier layer. For details of this latter process the reader is referred to M. Fleischmann and M. Liler: "The Anodic Oxidation of Solutions of Plumbous Salts," Transactions of the Faraday Society, No. 429, vol. 54, part 9, September 1958. This procedure simplifies and shortens the formation process.

It should be noted that pastes and forming processes resulting in ortho-rhombic ($\alpha$) $PbO_2$ are preferred to those giving tetragonal ($\beta$) $PbO_2$. Planté types are preferred.

FIGURE 4 shows by way of example a foil having a series of wavy vertical shallow grooves 31 on each side, the grooves on each side being out of register to minimize weakening of the material. The purpose of the grooves 31 is to increase the surface area of active material for a given length and breadth of the foil; the grooves on the positive side can accordingly be more numerous and/or deeper than those on the negative side so as to provide a greater surface on the positive side. When the grooves are initially formed in the barrier layer they assist in anchoring the active material thereto. The purpose of having the grooves more or less vertical is to minimize resistance to vertical flow of liquids and gases.

The grooves 31 can be produced by scraping, that is mechanicaly cutting into the foil surfaces, but if they are provided in a metallic barrier layer 4 they are preferably made by an etching process in order to give the grooves undercut walls so as to be better capable to anchor the relatively loose active material. Etching processes similar to those used for the production of half-tone printers' blocks can be used suitably adapted to the etching of long strips of foil in bulk.

The printing and etching method of production of the groove pattern on both sides of the foil permits a controlled etching treatment which indicates the depth of the grooves by the shade of the foil surface; it also effects a substantial increase of the foil surface by the roughening action of the mordant on the metal, and enables a freedom in design of the groove pattern on both sides of the foil which is not permitted if the grooves are formed by scraping owing the tooling limitations in the latter method.

An important factor determining the life of a conventional accumulator is the rate of shedding of the active material from the plate or grid. The surface layer structure of the active materials on the foils 4, their enclosure in the separator films 7, the elastic nature of the central separator 15 of each cell and the endwise pressure on the module over its whole area practically eliminate this factor. The life of the module of the invention, however, is critically influenced by the corrosion of the conducting barrier layer 4 or the rate at which its impermeability is lost. The retarding of pinholing of the barrier layer 4 is therefore of great importance for the storage battery of the present invention and FIGURES 5 and 6 illustrate two different methods of achieving this aim.

FIGURE 5 shows a barrier layer 4 consisting of fine filaments of lead 20 embedded in a layer of insulating medium 21 and extending between two lead foils 22, 23 sandwiching this insulating layer. This barrier layer 4 may be produced by compressing and potting fine lead wool in a plastics (for instance P.V.C.) or elastomeric compound, slicing it and laminating it with the foils 22, 23 or it may be produced by growing whiskers on both lead foils 22, 23 and bonding them together with an elastic resin-adhesive which fills the space between the whiskers completely. Corrosion of the filaments 20 can only start after the lead foils 22, 23, are penetrated and it can proceed only very slowly along the length of each filament owing to its very small cross-section. Corrosion is further impeded through the blocking of the corrosion channel by the increased volume of the corrosion product and the elastic nature of the insulating medium 21 which under pressure over the whole area of the module tends to close the corrosion channel. Compounding this medium 21 with an ion exchange resin further helps to retard corrosion by virtue of its direct reaction with the corroding acid and subsequent swelling. Instead of lead wool, steel wool, aluminium or tin wool, or filaments of another metal or alloy may be used and the choice of the metal or alloy of these filaments be determined by the potentiostatic method described later.

Figure 6:
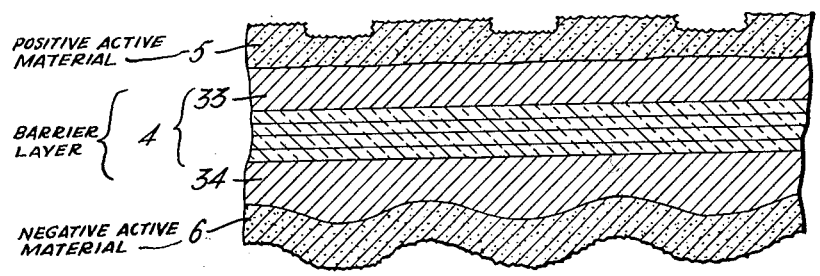

FIGURE 6 shows a foil structure having a barrier layer 4 produced by coating two lead foils 33, 34 on one side with a double coat of a "paint" containing a very high proportion of highly conductive graphite in a resin medium such as P.V.C. or an elastomeric composition and bonding the lead foils together, coated sides facing, for instance under heat and pressure. Graphite does not react with sulphuric acid and the four-layer coating ensures freedom from pinholes. Although P.V.C. and similar resin mediums are electrical insulators, the high proportion of highly conductive graphite ensures that the barrier layer as a whole is electrically conductive through its thickness over substantially its whole area. The graphite serves as the conductor and resin medium as a binder and it will be apparent that in view of the respective functions and the further of the barrier layer that the higher the proportion of graphite and the lower the proportion of the binder concomitant with a continuous pinhole-free barrier layer the better. An alternative coating material to the above graphite "paint" is the type of product known commercially as a "conductive" plastic medium. The electrical resistance of a graphite layer is however higher than that of metallic layer of equal thickness. Active layers 5, 6 are formed on the lead foils 33, 34 by any of the processes described with reference to FIGURE 3; wavy vertical grooves such as shown at 31 in FIGURE 4 are formed in the foils 33, 34 before the formation of the active material as described with reference to that figure.

In FIGURE 3 a metallic barrier layer 4 is illustrated. If it could be tolerated thick enough for the expected life of the module it could be simply an ordinary rolled pure lead foil or a foil of one of the lead alloys recently favoured for use as grids in conventional batteries (for instance lead-calcium or lead-tin-barium), or a graphite coated metal foil of these or other metals or alloys, such as titanium, various stainless steels and other nickel alloys. However, to find the best metal or combination of metals for the barrier layer by trial and error would be a formidable undertaking, and instead recently developed potentiostatic methods may be used not only for narrowing this choice but for discovering precisely what is the best metal for the barrier layer under given conditions.

By a potentiostatic investigation it is possible to predetermine the corrosion resistance of a given barrier layer at the potentials and in the sulphuric acid concentrations at which it works in the cell after the outer layers have been penetrated by the acid. Potentiostats are electronic regulators using a three terminal arrangement which enable the investigator to stabilize the potential of an electrode against another electrode (which in our case is that of the foil forming the barrier layer) and to measure the current which is necessary to maintain this potential at a desired value. For a closer understanding of these instruments and their mode of operation the reader should consult the following references:

A. Bewick, H. Fleischmann and M. Liler: "Some Factors in Potentiostat Design," Electrochimica Acta, 1959, vol. 1, pp. 83 to 105 (see particularly FIGURE 1 of this paper and the references).

I. Sanghi and M. Fleischmann: "Some Potentiostatic Studies on Zinc," Electrochimica Acta, 1959, vol. 1, pp. 161–176 (see particularly FIGURES 1 and 2 of this paper).

Figure 7:
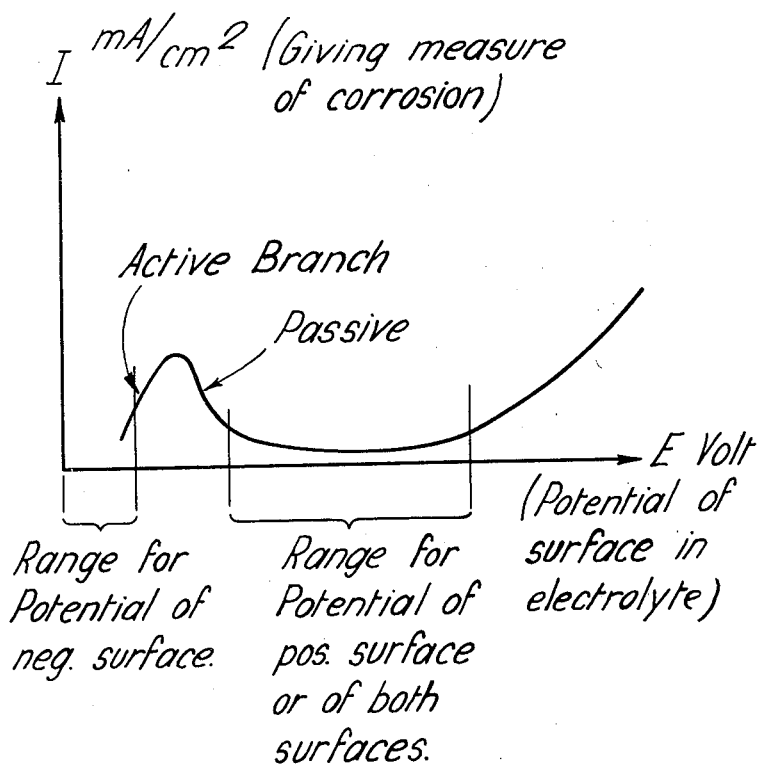
FIGURE 7 is a graph illustrating a potentiostatic investigation.

C. Edeleanu: "The Potentiostat Technique for Studying the Acid Resistance of Alloy Steels," Journal of the Iron and Steel Institute, February 1958, vol. 158, pp 122–132. The corrosion behaviour of most metals follow the general pattern illustrated in FIGURE 7. The metal first dissolves as the potential is made more positive, the corrosion rate soon reaching a maximum and then dropping to a low value. This phase is called the passive branch of the E/I curve.

The potentials are usually stated with reference to a "normal hydrogen electrode" (that is hydrogen gas at one atmosphere on a platinum electrode) in a solution containing hydrogen ions at unit activity (roughly a concentration of one mole per litre). On this scale the negative side of our barrier foil would at full charge be approximately $-.35$ volt and the positive side $+1.65$ volts making a total cell potential of approx. 2.0 volts. When the cell is fully discharged the potential of the negative surface will be less negative and that of the positive surface less positive due to the fall in sulphuric acid concentration. It would be possible to shift the above potentials by changing the electrolyte (say adding another sulphate, for instance sodium sulphate), or working at other specific gravities and degrees of discharge than is usual in present accumulator practice. This is not intended by the present invention which aims at providing such a barrier layer that the potentials of its surfaces fall into the passive branch of the E/I curve or have one surface which is more negative than the start of the active branch.

For the positive side titanium is nearly ideal as its corrosion (I) at $+1.65$ volts is very minute but at $-.35$ volt its E/I curve has a highly active branch. Modified austentic stainless steels with an approximately composition of 8% chromium, 18% nickel, and either 6% molybdenum+2% copper or 2% molybdenum and 6% copper have a fairly low corrosion rate at $+1.65$ volts while the E/I curve only starts at a potential more positive than $-.35$ volt so that at the negative surface no dissolution of the steel occurs at all, only hydrogen evolution. There are, however, objections both because of their price and because of the copper content of these steels. With aluminium and aluminium alloys the standard potential is so negative, that means that the E/I curve is so far displaced to the left, that both surfaces might be brought into its passive branch.

The above discussion of the potentiostatic method will suffice to indicate the sort of investigations required for the choice of a suitable barrier layer 4. It will also be apparent from this discussion that in general where the barrier layer is metal a two-ply metal foil will be preferred, for example aluminium tin or titanium on the positive side and very thin steel on the negative side. If desired these (or any other) two-plies can be united by a lay of tin or solder.

Figure 8:
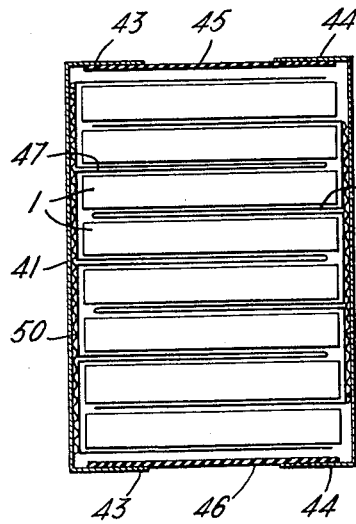
FIGURES 8 and 9 are horizontal sectional views of two forms of battery comprising interconnected modules, FIGURE 9 being shown partly broken away.
Figure 16:
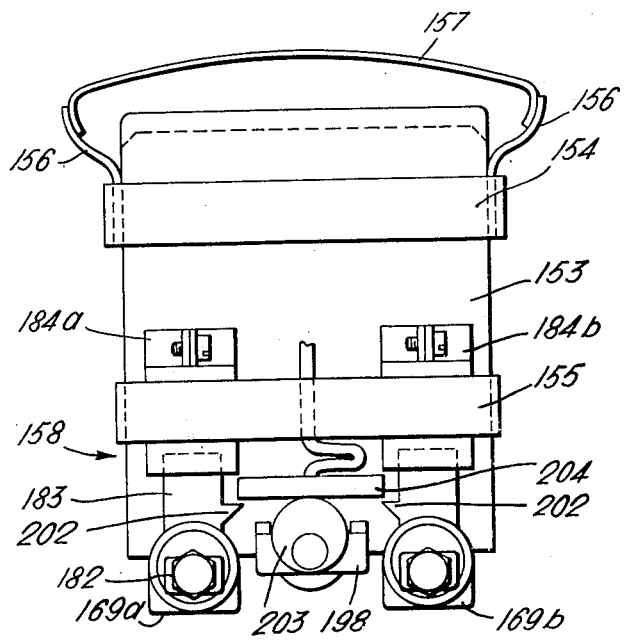
FIGURE 16 is an end view of the FIGURE 10 battery.
Figure 12:
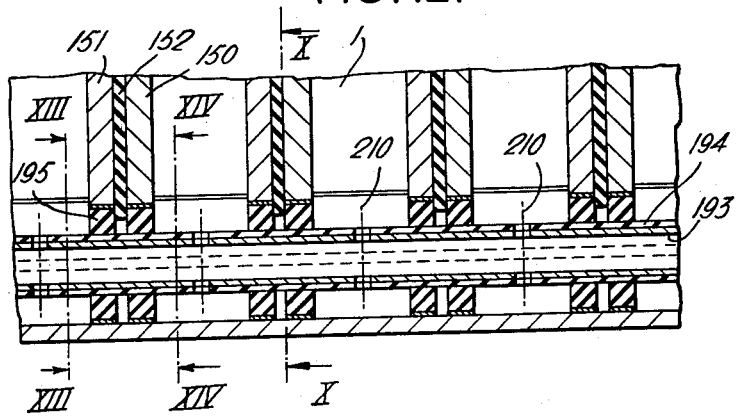

As has been explained, the module 1 illustrated in FIGURES 1 and 2 requires mechanical support. In general it will also be necessary to assemble a number of modules in one battery to provide adequate ampere-hours. FIGURE 8 shows a battery comprising eight parallel-connected modules 1 each represented simply as a rectangle. The battery comprises a pair of stout metallic channel-members 41, 42 embracing opposite sides of the modules 1 which are arranged end to end in a row the flanges 43, 43, 44, 44 of the channel members overlying the end modules of the row and being spaced therefrom by insulating pressure-distributing end plates 45, 46. The modules 1 are disposed with their ends of similar polarity adjacent one another and interconnected by two bands 47, 48 one for the positive ends and the other for the negative ends. Each band 47, 48 is made of strong, highly conductive and highly flexible foil, such as copper foil, which is covered with lead and makes contact over the whole area of each module end face of one polarity, being led concertina-fashion down one side of the row of the modules and in and out between appropriate end faces. Current is transmitted from the bands 47, 48 to the channel members 41, 42 (whose webs preferably bear an intimate coating of lead on their inner sides) by means of further bands 50, 51 which are crimped over their whole area and extend over the greater part of the length of the webs of the members 41, 42 in contact therewith and with the bands 47, 48, the bands 50, 51 thereby forming shunts for current in the bands 47, 48. Terminals (not shown) are provided on the flanges 43, 44 at one end of the battery: alternatively foil ends of bus bars or tape cables could be sandwiched between the end plates 45, 46 and bands 47, 48 respectively. The channel members 41, 42 are held together by means not shown (e.g. flexible shape) and, like the bands 47, 48, 50, 51, extend over the height of the modules nearly up to the outlets of their spilling channels: the webs of the members 41, 42 mount spilling ducts at their upper edges to receive liquid discharged from the spilling channels, the ducts sloping to one end of the battery, and if desired containing an absorbant material such as cotton wool (these ducts are not shown in FIGURE 8; however ducts are indicated in a somewhat similar construction illustrated in FIGURE 16). The exposed surfaces of the members 41, 42 are coated with an insulator (e.g. a neoprene jacket).

Figure 9:
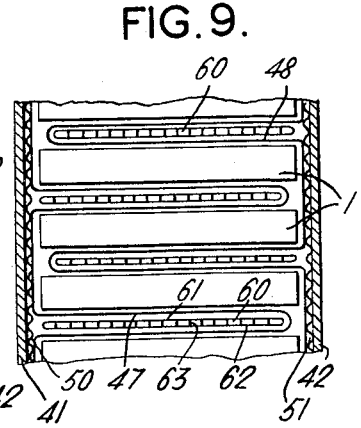

In the simple construction shown in FIGURE 9 the channel-members 41, 42 exert a strong, slightly resilient endwise pressure on the modules to provide support thereto and to ensure good contact between the modules and the bands 47, 48. The members 41, 42 also exert a sideways pressure on the modules which is somewhat resilient due to the crimping of the bands 50, 51 which renders them compressible over their thickness: this provides lateral support to the modules as well as ensuring good electrical contact between the bands 47, 40 and 48, 51 and between the bands 50, 51 and the respective channel members 41, 42.

To increase the resilience of the endwise support provided to the modules, springs or rubber pads can be provided acting between the flanges 43, 44 and either or both of the insulating plates 45, 46. Rubber pads could also be provided between these plates and the adjacent module end face.

FIGURE 9 illustrates a battery construction which is generally similar to that of FIGURE 9 and in which corresponding parts are given corresponding numerals without further description. The FIGURE 9 construction is distinguished from that of FIGURE 8 by the provision of cooling plates 60 between the modules 1, which are sandwiched between folds of the appropriate bands 47, 48. Each cooling plate comprises a pair of thin sheets 61, 62 of a highly conductive material (e.g. lead plated aluminium) which are joined at either side and held in spaced relation over their width, against the end pressure exerted by members 41, 42, by vertical spacers 63 of similar material. If natural draught air cooling is desired the plates are open at top and bottom. Alternatively the battery can be water cooled by connecting the top and bottom of each plate to headers located in a water circuit including a pump: provision can also be made for alternative air and water cooling, the water cooling being used for example during rapid changing. The headers can be located in various positions and the channelling within the plates 60 arranged suitably. In a further alternative construction the plates can simply be filled with water for a desired time and emptied again afterwards.

If desired, the plates 60 can be omitted and the bands 47, 48 replaced by current-conducting bands providing also cooling passages all over their length, e.g. long and flexible versions of the plates 60.

Naturally the cooling provisions can also be used for warming the battery.

During filling of the FIGURE 9 battery with electrolyte or during topping up the battery the upper edges of the cooling plates 60 must be covered up and/or overspilled liquid must be collected in a tray or drain. For covering the upper edges of the cooling plates a device comprising rubber strips held in a frame may be used.

The cooling plates 60 can be provided with rubber legs protruding below the bottom edge of the modules 1 and the battery can rest on these legs instead of resting on the cushions formed by the elastomeric sealing compound covering the bottom of the modules as previously described, which cushions can then be dispensed with.

A rubber leg underneath one of the narrow vertical sides of the cooling plates 60 may continue as an insulating strip all along this side of the plate in order to insulate this side and to prevent electrical contact between it or the adjacent band 47 or 48 and members 41 or 42 and associated with bands of opposite polarity. The other narrow vertical side of the cooling plate need not be so insulated: it may protrude slightly laterally beyond the vertical side edges of the adjacent modules 1 so that it makes good pressure contact with the appropriate elastic metal foil 47 or 48. The insulation of the narrow vertical side of the plates 60 can, of course, be effected by a plastic strip, adhesive tape, or other means.

FIGURES 10 to 16 show a battery comprising twenty modules and means for switching these modules so as to provide either a heavy current 12-volt output or a light current 240-volt output: cooling means are also provided. The twenty modules are arranged in end to end relation with a pair of cooling plates 150 and 151 and an insulating sheet 152 between each pair of adjacent modules; at least one cooling plate and sheet are disposed adjacent the ends of the extreme modules. The modules, cooling plates 150, 151 and insulating sheets 152 are held between rigid insulating end plates 153 by a pair of stout nylon straps 154, 155 surrounding the entire assembly. The upper strap 154 carries a channel member 156 running the entire length of the assembly at either side thereof and providing a spilling duct to receive liquid discharged from the cells. The channel members 156 are inclined to one end to discharge liquid free of the battery, and locate a porous cover 157 for the assembly. The lower strap 155 mounts a switch gear arrangement designated generally 158 at either end of the assembly.

Each cooling plate designated generally 150, 151 comprises a rectangular metal sheet 159 which extends over the whole area presented by the extreme end foil of the adjacent module and has a flat surface in overall contact therewith. The sheet 159 carries a series of integral ribs 160, 161 and projections 162, 163 and 164, all of which ribs and projections extend into sealing engagement with the insulating sheet 152 which is conveniently made of P.V.C. or other slightly resilient substance. The ribs 160 are located at the extreme side edges of the sheet 159 and extend from top to bottom while the ribs 161, located halfway between the side edges and the centre line, extend only two-thirds from the bottom to the top. The projections 162 form a series aligned at the top edge of the cooling plate while the projections 163 form a pair located adjacent to and on opposite sides of the centre line, at the bottom of the plate. Projections 164 are located between each rib 161 and adjacent projection 163 and somewhat above them. The ribs 160, 161 extend just below the bottom of modules and provide two pairs of opposed recesses 166, one pair near each side edge of the cooling plate corresponding recesses 166 on the various cooling plates being aligned longitudinally of the battery. The recesses 166 receive bulbous extremities 168 of the flanges of a pair of neoprene-covered metal channel section members 169a, 169b which run the full length of the battery below the modules, cooling plates 150, 151 and insulator sheets 152 and form positive and negative 12-volt busbars respectively and also cooling water headers, as lated described. The projections 163 also extend just below the bottom of the modules and define a pair of opposed recesses 166a. The recesses 166a on the various plates are aligned longitudinally of the battery and receive the bulbous edges 168a of an elastic neoprene member 170 of U section which like the busbar members 619a, 169b runs the full length of the battery below the modules, plates 150, 151 and sheets 152. A switch device designated generally 171 is located within the member 170.

The modules are arranged with adjacent end foils of similar polarity; the cooling plates 150, 151 located between positive module end foils differ from those between negative module end foils in that the former are provided with means for connecting them only to the positive busbar member 169a and the latter only to the negative busbar member 169b: all the cooling plates are provided with means (described later) for connecting them to the switch means 171. The connection means on the cooling plates 150, 151 for connection to the busbar member 169a comprise a thickening 173 adjacent the bottom edge of the sheet 159 in vertical alignment with the member 169a and continuing into a bevelled projection 174 extending below this bottom edge, the bevels on plates 150, 151 being oppositely disposed to form a V-shaped nose 174a extending into the busbar member. Opposite each nose 174a and within the member 169a there is located a collector shoe 175 presenting a V-section recess 176 to mate with the nose 174a. The shoe 175 is urged upwardly by a spring 177 seating in a retaining cup 178 and bearing against the web of the busbar member 169a. All the shoes 175 are longitudinally apertured at 175a and threaded on an actuating or guide rod 179, being located in proper axial position thereon by means of distancing springs 180. The ends of the guide rod 179 are received in eccentric cams 182 mounted on the ends of the busbar member 169a and forming part of the switch gear 158 above referred to. In addition to mounting the shoes 175 the guide rod 179 mounts, at each end of the battery, wedge blocks 183 to cooperate with 12 volt positive terminal members 184a secured by the strap 155. It will be understood that with the eccentric cams 182 in one position the guide rod 179 assumes a low position in which it holds the shoes 175 against the springs 177 and out of contact with the noses 174a on the cooling plates 150, 151 while rotation of the eccentric cams 182 by 180° will bring the guide rod 179 to a high position (as illustrated in the drawing) wherein the shoes 175 engage the noses 174a in firm contact due to the upward force exerted on the shoes both through the guide rod and through the springs 177. With the guide or actuating rod 179 in its high position, the wedge blocks 183 make contact with the corresponding terminal member 184a while in the low position of the guide rod 179 the terminal member is disconnected. It will be appreciated that the distancing springs 180 between the shoes 175 together with the play allowed by the oversize apertures 175a therein which receive the guide rod 179 prevent any slight misalignment between shoes and cooling plates from spoiling the contact between them.

It will be appreciated that the cooling plates 150, 151 in contact with negative module end foils are connected in similar manner to a negative terminal member 184b: similar parts are given similar reference numerals and further description will be superfluous. It will also be appreciated that both the busbar members 169a, 169b and the actuating or guide rods 179 are available to carry the 12-volt current.

Figure 13:
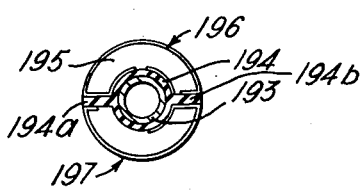
FIGURES 13 and 14 are scrap sections of a switch device forming part of the FIGURE 10 battery, the sections being taken on lines XIII—XIII and XIV—XIV respectively shown in FIGURE 12.
Figure 14:
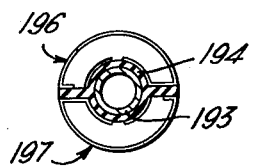
Figure 15:
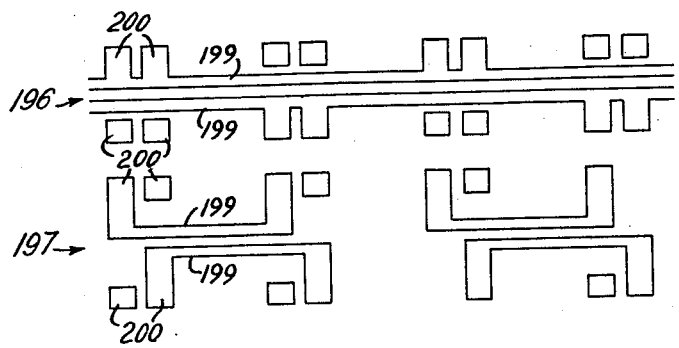
FIGURE 15 is a composite plan view of switch patterns forming part of the switch device.

All cooling plates 150, 151 are provided with means to connect them to the switch device 171, this means consisting of a thickening 190 disposed centrally adjacent the bottom edge of each sheet 159 terminating in a concave arcuate contact surface 191. The switch device 171 comprises an insulated central metal support tube 193 surrounded by an insulating sleeve 194 with two longitudinal ribs 194a, 194b and mounted on the sleeve a series of plit rubber bushes 195 registering with the cooling plates 150, 151, the splits in the bushes receiving the ribs 194a, 194b. The bushes 195 and sleeve 194 carry a 12-volt and a 240-volt switch pattern formed of highly conducting foil: these patterns are shown in FIGURE 13, and designated generally 196, 197. The supporting tube 193 is mounted at its ends in blocks 198 forming part of the switch gear arrangement 158, and means are provided for rotating the tube 193 between two positions angularly spaced by 180°. In one position of the tube 193 the 12-volt switch pattern 196 is presented to the arcuate contact surfaces 191 of the cooling plates 150, 151 and in the other position the 240-volt pattern 197 is presented to these surfaces. In each position of the tube 193 the corresponding pattern 196 or 197 provides metal contact areas 199 on the bushes 195 which engage the surfaces 191 under pressure exerted by the neoprene member 170, and metal areas 200 which connect the contact areas 199 in desired manner, the areas 199 and 200 being respectively supported on surfaces of the sleeve 194 and bushes 195 as clearly shown in FIGURES 12 to 15. It will be understood that the 12-volt switch pattern 196 is supplementary to the connection provided through the busbar members 169a, 169b and could if desired be dispensed with but that the 240-volt switch pattern is the only available series connection for the modules. The 12-volt current can of course be heavy and the switch pattern 196 would not alone be sufficient to carry it safely. On the other hand the 240-volt current will be relatively light and the switch pattern 197 will be perfectly adequate.

As a safety precaution, the wedge blocks 183 have extensions 202 thereon, and the tube 193 of the switch device 171 carries an eccentric 203 at either end of the battery: the extensions 202 and eccentrics 203 coact with a vertically movable horizontal blocking bar 204 which prevents a 240-volt connection from being made to the battery unless the bar occupies the lower of two possible positions: the blocking bar 204 will however occupy the upper position under the influence of either or both wedge block extensions 202 and/or the eccentric 203 unless the busbar members 196a, 196b are disconnected from the 12-volt terminal members 184a, 184b and the switch device 171 is positioned to make the 240-volt connections.

In the space defined by each cooling plate 150, 151 and the adjacent insulating sheet 152 there is disposed an inflatable sealing member designated generally by the numeral 206. This member, which can conveniently form an integral part of the insulating sheet 152 itself, comprises a horizontal limb 207 running the width of the cooling plate between the ridges thereof and trapped just below the projections 162, a central vertical limb 208 bifurcated near the bottom edge of the plate to accommodate the thickening 190 and merging into lateral extensions 209 which extend in the region just above the projection 164 between the thickening 190 and either rib 161. The hollow spaces within the inflatable member 206 communicate with each other and with the space within the neoprene member 170 which is not occupied by the switch device 171. This space in turn communicates with the interior of the tube 193 by means of a series of holes 210 located at intervals along the tube between the bushes 195 thereon. The tube 193 is connected at one of its ends (by means not shown) to a compressed air source (also not shown). It will be seen that with the member 206 deflated each cooling plate 150 or 151 and associated insulating sheet 152 defines through-passages for cooling air comprising the apertures 211 between the projections 163, 164, the space between the sheeets 159 and 162, and the apertures 212 between the projections 162. However, with the member 206 inflated by the application of compressed air to the tube 193, all these apertures are blocked. The main purpose of the projections 162, 163 and 164 is to stop expansion of the member 206 in undesired directions on inflation. Shallow ribs 213 are provided at the middle of the sheet 159 to register with the limb 208 of the member 206 and prevent left and right hand parts of the space between sheets 159 and 172 from being blocked off on expansion of that member.

Busbar members 169a and 169b provide respectively output and input headers for cooling water, and are accordingly connected at their ends to supply and discharge means (not shown). The spaces within the members 169a and 169b are in communication with the space within each cooling plate 150, 151. It will be seen that the thickenings 173 extend over only part of the width of each member 169a or 169b so that communication is permitted around these thickenings. It will be appreciated that the top of the members 169a, 169b is closed by the modules, cooling plates 150 and insulating sheets 152 except for the flow passages just described: a gasket may be provided to assist sealing.

For light currents at either 12 or 240 volts the water pressure to the input header provided by the busbar member 169b is shut off as is also the compressed air supply to the tube 193; hence the member 206 is deflated and natural draught air-cooling of each cooling plate 150, 151 takes place through apertures 211, 212. For heavy currents the compressed air and water pressure are turned on so that the member 206 is inflated to block off apertures 211, 212, and cooling water circulates as shown by the arrows in FIGURE 10.

To remove water from the cooling plates 150, 151 air may be blown through the busbar members 169a, 169b, and to assist deflation of the member 206 suction may be applied.

Naturally other cooling fluids besides water can be used, and the inflation of the member 206 could be carried out by, say, water under higher pressure than the water flowing around that member.

Instead of closing the apertures 211, 212 in the various cooling plates by the inflatable members 206, various alternative arrangements such as rubber strips or wedges, movable flaps, belts etc. can be resorted to, through the inflatable member 206 is preferred.

The battery just described permits heavy charge or discharge, and operation at either 12 or 240 volts. It has the great advantage that it can be charged from a 240-volt (or slightly higher voltage) A.C. mains through a relatively small rectifier without the need for a transformer.

Various different features of the invention can be combined in different ways. Among various possible modifications, the FIGURE 9 construction can be modified by replacing the bands 47, 48, 50, 51 by a pair of bands disposed in the manner of the bands 47, 48, each band consisting of a pair of copper foils coated with lead on their outer sides and sandwiching metal wool or curled swarf produced in machining. Such bands are resilient over their thickness and in conjunction with endwise and lateral pressure effect good electrical and heat-conducting contact. The foils provide through passages which can be left open for air cooling or closed at top and bottom except for inlet and outlet openings to headers.

The expression "foil" has been used throughout the specification. There is no universally accepted definition of foil enabling it to be distinguished from sheet. In commerce the various trades draw the line according to a given thickness which varies with different materials: for a given material the distinguishing line varies with different trades and in different countries. Broadly, it may be said that all cares sheet less than .006″ thick is universally called a foil but that a sheet more than .030″ thick is never so called, the classification being arbitrary between these limits. Herein the term foil is intended to cover sheets up to at least about .030″ provided that the sheet can be reeled and treated in the manner of a flexible band.

I claim:

1. In a secondary battery having a plurality of individual units to be activated by an electrolyte and connected electrically in series, the combination of a plurality of closely spaced generally parallel aligned multilayer intermediate sheets each layer being less than 0.030 inch thick, electrolyte resistant electrical insulating material separating said sheets from one another round their peripheries and hermetically sealing said sheets at least over the whole of those edge portions which are to be below the level of the electrolyte, thereby forming a plurality of closely spaced generally parallel aligned electrolyte chambers separated by said sheets, each said sheet comprising two outer layers of active material of opposite polarity bounding the respective chambers on either side of the sheet and at least one barrier layer between them, said barrier layer being of a material which is electrically conductive through its thickness and yet remaining impervious to the electrolyte through many cycles of charge and discharge under the potentials due to the active layers in contact with it, both outer layers extending over substantially the whole area of the sheet, covering means pervious to the flow of electrolyte and resistant to chemical reaction with the electrolyte disposed closely about the outer layers for holding the outer layers each as a coherent mass in good electrical contact with the barrier layer so that when the chambers are filled with electrolyte the current flow through the whole series of cells is substantially normal to the surface and through the thickness of all of the sheets and is distributed over substantially their whole area, assembled in end to end relation with adjacent extreme conducting layers of similar polarity, a pair of conducting bands each led concertina-fashion adjacent extreme conducting layers of all units of one polarity respectively, the band connected to conducting layers of one polarity being led along one side of said units and the other band along the other side of said units, the bands making contact with the conducting layers over substantially the entire area thereof, and retainer means embracing the units and exerting endwise pressure.

2. A secondary battery as set forth in claim 1, including further pervious separator means between the active layers in each electrolyte chamber and wherein said means exerting endwise pressure through the electrically conductive means, serves to conduct electric current from and to the battery.

3. A secondary battery as claimed in claim 2, wherein the separator means is compressible and the pressure-exerting means includes an elastic member whereby the pressure is exerted elastically.

4. A combination as claimed in claim 1, wherein each intermediate sheet comprises a layer of metal and at least one active layer electro-deposited thereon.

5. A combination as claimed in claim 1 of the lead acid type, wherein each barrier layer comprises a layer selected from the group aluminium, steel, titanium, stainless steel and tin.

6. A combination as claimed in claim 1, wherein each intermediate sheet comprises at least two intimately secured layers of different metals.

7. A combination as claimed in claim 1 of the lead acid type, wherein each intermediate sheet comprises a layer having a lamina on the positive side composed of a metal selected from the group comprising aluminium, tin, and titanium and a lamina on the negative side composed of steel.

8. A combination as claimed in claim 1, wherein each intermediate sheet comprises a layer formed of metal filaments embedded in an insulating impervious matrix, said filaments extending between either face of the matrix and being distributed substantially over the whole area of the sheet.

9. A combination as claimed in claim 1, wherein each intermediate sheet comprises a laminate formed by a pair of metal layers coated over substantially their whole area with graphite and bonded together with the graphite coatings in contact.

10. A combination as claimed in claim 1, wherein the surface of at least some of the layers is formed with indentations to increase the area thereof available for contact with electrolyte.

11. A combination as claimed in claim 1, wherein intermediate sheets have their side edges sealed within the centre fold of an insulating tape which is thrice-folded to a concertina formation, and the insulating tapes have adjacent side edge portions sealed together.

12. A combination as claimed in claim 11, wherein adjacent side edges of the insulating tapes sandwich pervious elastic separators in sealing engagement.

13. A combination as claimed in claim 1, wherein the sheets are bound over all their edges with insulating binding tape.

14. A combination as claimed in claim 1, wherein the intermediate sheets have their side edges sealed within the centre fold of an insulating tape which is thrice-folded to a concertina formation, and the insulating tapes have adjacent side edge portions sealed together, the sheets and tapes being set in an elastomeric sealing composition to seal their bottom edges.

15. A combination as claimed in claim 1, wherein at least the top edges of the sheets are bound with an insulating tape and formed to provide for spilling of electrolyte when the level thereof in each cell lies below the top edge of the tape and above the lower edge thereof.

References Cited in the file of this patent

UNITED STATES PATENTS

| | | |
|---|---|---|
| 420,234 | Johnson | Jan. 28, 1890 |
| 441,959 | Kennedy | Dec. 2, 1890 |
| 620,593 | Kennedy | Mar. 7, 1899 |
| 701,804 | Edison | June 3, 1902 |
| 1,150,023 | Ford | Aug. 17, 1915 |
| 1,164,746 | O'Connor | Dec. 21, 1915 |
| 1,285,660 | Ford | Nov. 26, 1918 |
| 1,882,414 | Ford | Oct. 11, 1932 |
| 1,924,959 | Patterson | Aug. 29, 1933 |
| 2,167,809 | Lubeck | Aug. 1, 1939 |
| 2,227,463 | Neale | Jan. 7, 1941 |
| 2,229,431 | Young | Jan. 21, 1941 |
| 2,282,923 | Ambruster | May 12, 1942 |
| 2,496,709 | Gelardin | Feb. 7, 1950 |
| 2,519,785 | Okolicsanyi | Aug. 22, 1950 |
| 2,686,279 | Barton | Aug. 10, 1954 |
| 2,807,658 | Hatfield | Sept. 24, 1957 |
| 2,988,587 | Haring | June 13, 1961 |
| 3,006,980 | Story | Oct. 31, 1961 |

FOREIGN PATENTS

| | | |
|---|---|---|
| 877,572 | France | Sept. 7, 1942 |
| 30,393 | France | Feb. 2, 1926 |
| | (Addition to No. 601,227) | |